(12) United States Patent
Hyodo et al.

(10) Patent No.: US 12,012,725 B2
(45) Date of Patent: Jun. 18, 2024

(54) LOADING WORK VEHICLE

(71) Applicant: HITACHI CONSTRUCTION MACHINERY CO., LTD., Tokyo (JP)

(72) Inventors: Koji Hyodo, Kasumigaura (JP); Masaki Yoshikawa, Kasama (JP); Tetsuji Tanaka, Abiko (JP); Masaki Nukii, Ushiku (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 645 days.

(21) Appl. No.: 17/273,844

(22) PCT Filed: Sep. 28, 2018

(86) PCT No.: PCT/JP2018/036236
§ 371 (c)(1),
(2) Date: Mar. 5, 2021

(87) PCT Pub. No.: WO2020/065914
PCT Pub. Date: Apr. 2, 2020

(65) Prior Publication Data
US 2021/0189690 A1    Jun. 24, 2021

(51) Int. Cl.
*E02F 9/22* (2006.01)
*E02F 3/34* (2006.01)
(Continued)

(52) U.S. Cl.
CPC .......... *E02F 9/2246* (2013.01); *E02F 3/3417* (2013.01); *E02F 3/422* (2013.01); *E02F 3/431* (2013.01); *E02F 9/2289* (2013.01)

(58) Field of Classification Search
CPC ......... E02F 3/3417; E02F 3/422; E02F 3/431; E02F 9/2246; E02F 9/2289
See application file for complete search history.

(56) References Cited

U.S. PATENT DOCUMENTS 10,392,781 B2 *  8/2019  Uno ..................... E02F 3/431
10,669,696 B2 *  6/2020  Takeda ............... F16H 61/4008
(Continued)

FOREIGN PATENT DOCUMENTS

JP    57-180511 A    11/1982
JP    5092071 B1    12/2012
(Continued)

OTHER PUBLICATIONS

International Search Report of PCT/JP2018/036236 dated Nov. 20, 2018.

*Primary Examiner* — Saul Rodriguez
*Assistant Examiner* — Brendan P Tighe
(74) *Attorney, Agent, or Firm* — MATTINGLY & MALUR, PC

(57) ABSTRACT

Provided is a loading work vehicle capable of improving work efficiency even when working on a slippery road surface. An HST-traveling-drive wheel loader 1 comprises a step-on amount detection sensor 610, a discharge pressure detection sensor 75, a mode switch device 60, and a controller 5. The controller 5 is configured to: determine whether a limit mode is selected by the mode switch device 60; specify an operation state of the wheel loader 1 when determining that the limit mode is selected; limit maximum traction force to a first set value which is set based on a static friction coefficient μ and vehicle weight when specifying that a bucket 23 is pushed into a natural ground 100; and increase the maximum traction force from the first set value when specifying that excavation of the natural ground 100 is started.

5 Claims, 10 Drawing Sheets

(51) Int. Cl.
*E02F 3/42* (2006.01)
*E02F 3/43* (2006.01)

(56) References Cited

U.S. PATENT DOCUMENTS

| | | | | |
|---|---|---|---|---|
| 2004/0211614 | A1 | 10/2004 | Matsuyama | |
| 2008/0234902 | A1* | 9/2008 | Johnson | E02F 9/2029 |
| | | | | 701/50 |
| 2013/0259619 | A1* | 10/2013 | Shirao | E02F 3/36 |
| | | | | 701/50 |
| 2020/0199852 | A1* | 6/2020 | Hyodo | E02F 9/2253 |
| 2020/0208377 | A1* | 7/2020 | Hyodo | E02F 9/2079 |
| 2020/0248436 | A1* | 8/2020 | Hyodo | E02F 9/2253 |
| 2021/0317637 | A1* | 10/2021 | Tanaka | F16H 61/0213 |

FOREIGN PATENT DOCUMENTS

| | | |
|---|---|---|
| JP | 5129493 B2 | 1/2013 |
| WO | 2013/183595 A1 | 12/2013 |

\* cited by examiner

LOADING WORK VEHICLE

TECHNICAL FIELD

The present invention relates to a loading work vehicle that performs loading work by excavating such as earth and sand and minerals, and loading them into such as a dump truck.

BACKGROUND ART

As represented by a wheel loader, in the case of a loading work vehicle including a hydraulic circuit for traveling and a hydraulic circuit for a work device that performs excavation, etc., it is important to balance between traction force (traveling drive force) and digging force of the work device. When the traction force is too great against the digging force of the work device, at the time of operating a lift arm to lift a bucket in the upward direction after pushing the bucket into an object to be excavated, slippage of wheels occurs. As a result of the slippage, the traction force becomes rather small, and thus loads such as earth and sand are hardly to be inserted onto the bucket. Furthermore, in this case, since reaction force acting on the lift arm increases at the time of pushing the bucket into the object to be excavated, there are cases where the reaction force becomes resistance which prevents the bucket and the lift arm from being lifted in the upward direction.

For example, Patent Literature 1 discloses a wheel loader comprising, as a hydraulic circuit for traveling, a traveling hydraulic pump which is a variable displacement hydraulic pump driven by an engine, and a traveling hydraulic motor which is a variable displacement hydraulic motor driven by hydraulic oil from a hydraulic oil pump, and using an HST circuit in which the traveling hydraulic pump and the traveling hydraulic motor are connected by a pair of main conduits to form a closed circuit. In the case of the wheel loader according to Patent Literature 1, at the time of pushing the bucket into the natural ground as an object to be excavated so as to insert the loads onto the bucket, by setting the maximum tilt of an HST motor to an upper limit value, the traction force is made to exhibit its maximum force to the upper limit value, thereby allowing the loads to be inserted sufficiently onto the bucket. Furthermore, at the time of performing a lifting operation of the lift arm to lift the bucket in the upward direction, by limiting the maximum tilt of the HST motor to about 50% to 70% of the upper limit value, the traction force is suppressed from being excessively increased. Accordingly, balance between lifting operation force of the lift arm (digging force of the work device) and the traction force is excellently maintained, thereby facilitating the lifting operation of the bucket containing the load therein.

CITATION LIST

Patent Literature

Patent Literature 1: JP-B-5129493

SUMMARY OF INVENTION

Technical Problem

At a work field, on a road surface where slippage of the wheels likely occurs, in other words, where a static friction coefficient between the wheels and the road surface is small, the wheels of the wheel loader slip even with the traction force lower than the set maximum traction force. Accordingly, when the wheel loader according to Patent Literature 1 pushes the bucket into the natural ground while traveling on the slippery road surface, slippage of the wheels likely occurs. When the wheels slip, the traction force is lowered at once while the road surface is dug and recessed, which lowers working efficiency of the wheel loader.

In view of the problems above, an object of the present invention is to provide a loading work vehicle capable of improving work efficiency even when working on a slippery road surface.

Solution to Problem

In order to achieve the object above, the present invention provides a loading work vehicle comprising: a plurality of wheels; an engine; a variable displacement type traveling hydraulic pump driven by the engine; a variable displacement type traveling hydraulic motor that is connected to the traveling hydraulic pump by a closed circuit and transmits drive force of the engine to the wheels; and a work device that is provided on a front portion of a vehicle body and rotatable in a vertical direction, wherein the loading work vehicle further comprises: a traveling state detection sensor configured to detect a traveling state of the loading work vehicle, an operation detection sensor configured to detect an operation of the work device; a mode switch device configured to switch between a limit mode for limiting maximum traction force of the loading work vehicle and a normal mode for not limiting the maximum traction force of the loading work vehicle; and a controller configured to control the traveling hydraulic pump and the traveling hydraulic motor, and the controller is further configured to: determine whether the limit mode is selected based on a mode switch signal from the mode switch device; in a case of determining that the limit mode is selected, specify an operation state of the loading work vehicle based on the traveling state detected by the traveling state detection sensor and the operation of the work device detected by the operation detection sensor; in a case of specifying that the vehicle body is traveling in a state of not performing a lifting operation of the work device, limit the maximum traction force of the loading work vehicle to a first set value which is set based on a static friction coefficient between a road surface and the wheels as well as weight of the vehicle body; and in a case of specifying that the work device starts excavating an object to be excavated, increase the maximum traction force of the loading work vehicle from the first set value.

Advantageous Effects of Invention

According to the present invention, it is possible to improve work efficiency even when working on a slippery road surface. The problems, configurations, and effects other than those described above will be clarified by explanation of the embodiment below.

DESCRIPTION OF EMBODIMENTS

Hereinafter, a wheel loader will be described as one of the aspects of a loading work vehicle according to an embodiment of the present invention.
(Overall Configuration of Wheel Loader 1)

Firstly, an overall configuration of a wheel loader 1 according to the embodiment of the present invention will be described with reference to FIG. 1 and FIG. 2.

Figure 1:
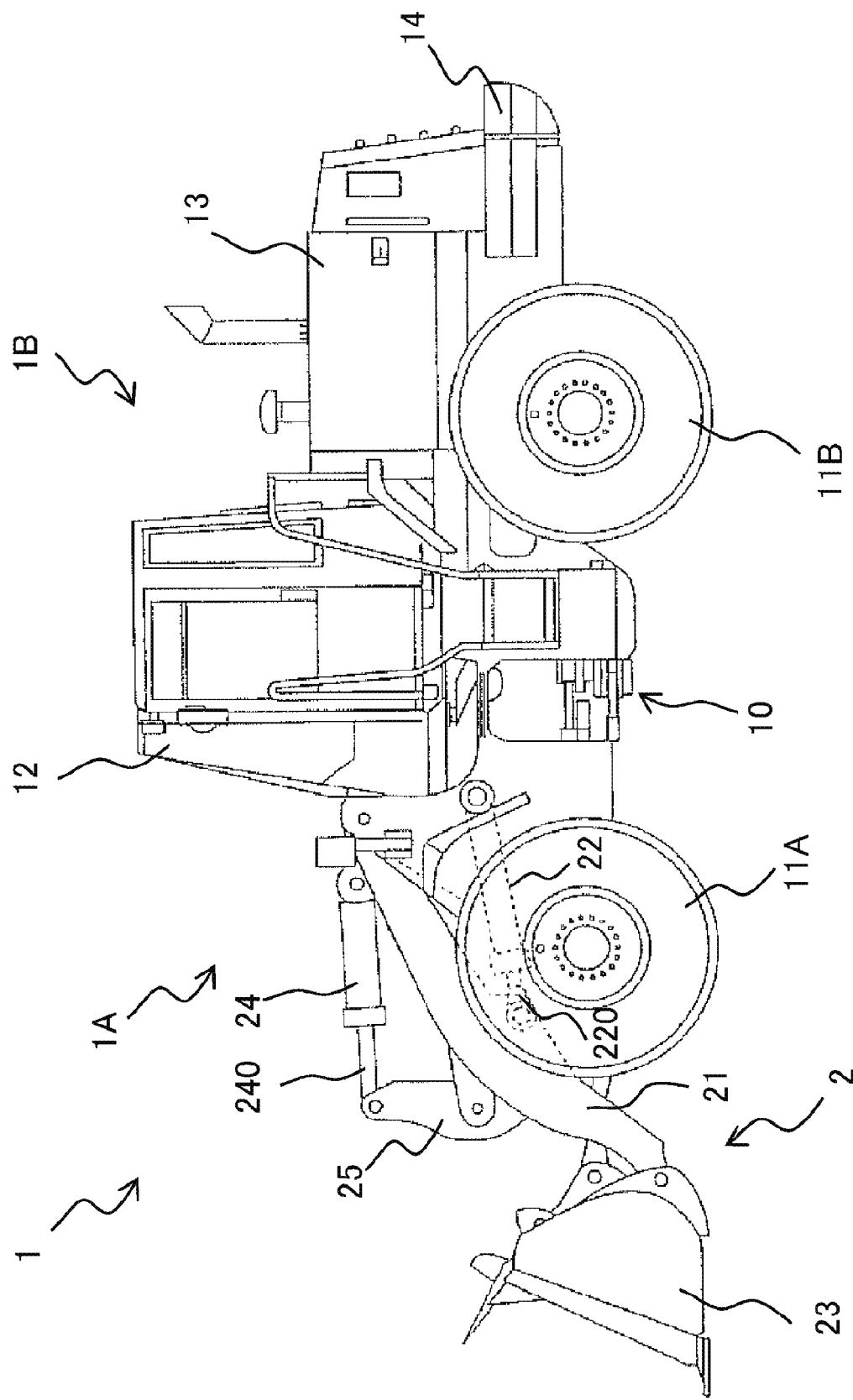
FIG. 1 is a side view illustrating appearance of a wheel loader according to an embodiment of the present invention.

FIG. 1 is a side view illustrating appearance of the wheel loader 1 according to the embodiment of the present invention. FIG. 2 explains excavation work performed by the wheel loader 1.

The wheel loader 1 includes a vehicle body which is provided with a front frame 1A and a rear frame 1B, and a work device 2 for loading work which is provided on the front of the vehicle body. The wheel loader 1 is an articulated type work vehicle which is swiveled on a central portion of the vehicle body and steered thereby. Specifically, the front frame 1A and the rear frame 1B are connected to each other by a center joint 10 to swivel in the left and right direction so that the front frame 1A is bent in the left and right direction with respect to the rear frame 1B.

The wheel loader 1 includes a pair of left and right front wheels 11A which is provided on the front frame 1A, and a pair of left and right rear wheels 11B which is provided on the rear frame 1B. FIG. 1 illustrates, among the pair of left and right front wheels 11A and the pair of left and right rear wheels 11B, only the left front wheel 11A of the pair of left and right front wheels 11A and the left rear wheel 11B of the pair of left and right rear wheels 11B. In the following, there are cases where the "front wheels 11A and rear wheels 11B" are collectively referred to as "wheels 11A, 11B".

The rear frame 1B is provided with an operator's cab 12 to be boarded by an operator, a mechanical room 13 in which devices such as an engine, a controller, and a hydraulic pump are accommodated, and a counterweight 14 for maintaining balance between the vehicle body and the work device 2 to prevent the vehicle body from tilting. In the rear frame 1B, the operator's cab 12 is disposed on the front, the counterweight 14 is disposed on the rear, and the mechanical room 13 is disposed between the operator's cab 12 and the counterweight 14, respectively.

The work device 2 includes a lift arm 21 attached to the front frame 1A, a pair of lift arm cylinders 22 configured to expand and contract to rotate the lift arm 21 in the vertical direction with respect to the front frame 1A, a bucket 23 attached to the front end portion of the lift arm 21, a bucket cylinder 24 configured to expand and contract to rotate the bucket 23 in the vertical direction with respect to the lift arm 21, a bell crank 25 that is rotatably connected to the lift arm 21 and constitutes a link mechanism between the bucket 23 and the bucket cylinder 24, and a plurality of conduits (not illustrated) for leading hydraulic oil to the pair of lift arm cylinders 22 and the bucket cylinder 24. FIG. 1 illustrates only one of the pair of lift arm cylinders 22, which is disposed on the left side, by indicating it by a broken line.

The lift arm 21 is rotated in the upward direction by expansion of a rod 220 of each of the lift arm cylinders 22, and rotated in the downward direction by contraction of each rod 220. The bucket 23 is tilted (rotated in the upward direction with respect to the lift arm 21) by expansion of a rod 240 of the bucket cylinder 24, and dumped (rotated in the downward direction with respect to the lift arm 21) by contraction of the rod 240.

The wheel loader 1 is a loading work vehicle configured to perform loading work by excavating such as earth and sand and minerals in a strip mine, etc., and loading them into such as a dump truck. In the wheel loader 1, the bucket 23 can be replaced with various attachments such as a blade, and in addition to general loading work, various work such as dozing work and snow removing work can be performed.

Next, excavation work of the wheel loader 1 will be described with reference to FIG. 2A to FIG. 2C.

Figure 2A:
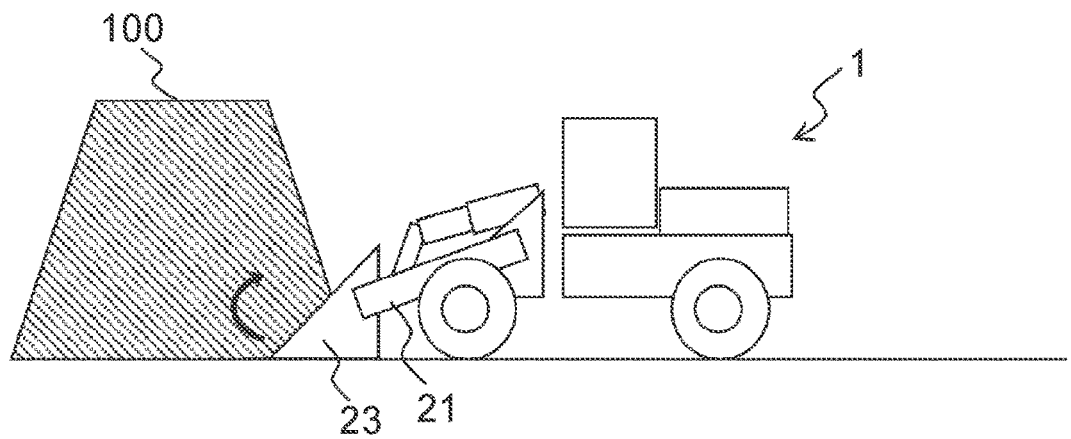
FIG. 2A to FIG. 2C explain excavation work performed by a wheel loader.

Firstly, the wheel loader 1 travels forward toward a natural ground 100 which is an object to be excavated at full throttle, and pushes the bucket 23 into the natural ground 100 (state illustrated in FIG. 2A). Next, an operator performs the lifting operation of the lift arm 21 while tilting the bucket 23, or performs the lifting operation of the lift arm 21 after tilting the bucket 23, to make the wheel loader 1 scoop up loads such as earth and sand and minerals (state illustrated in FIG. 2B). Then, due to the lifting operation of the lift arm 21 performed by the operator, the bucket 23 containing the loads therein is lifted further in the upward direction (state illustrated in FIG. 2C).

Figure 2B:
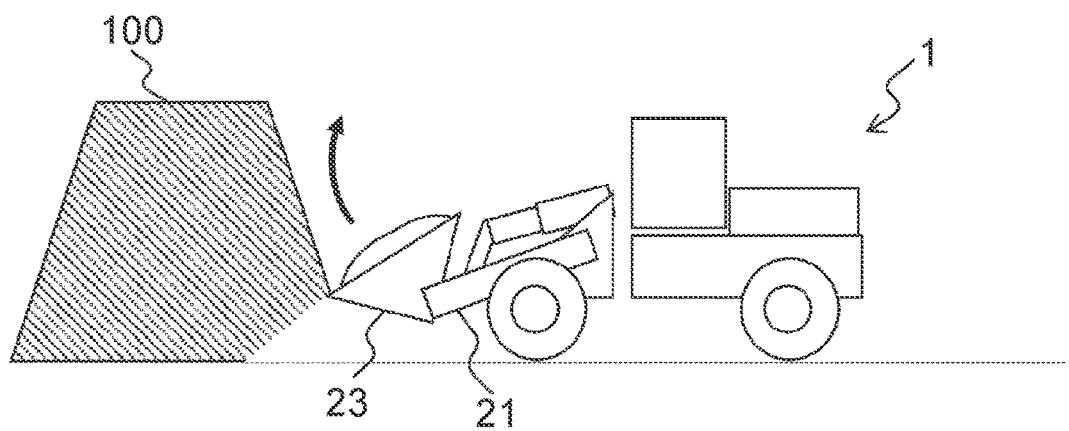
Figure 2C:
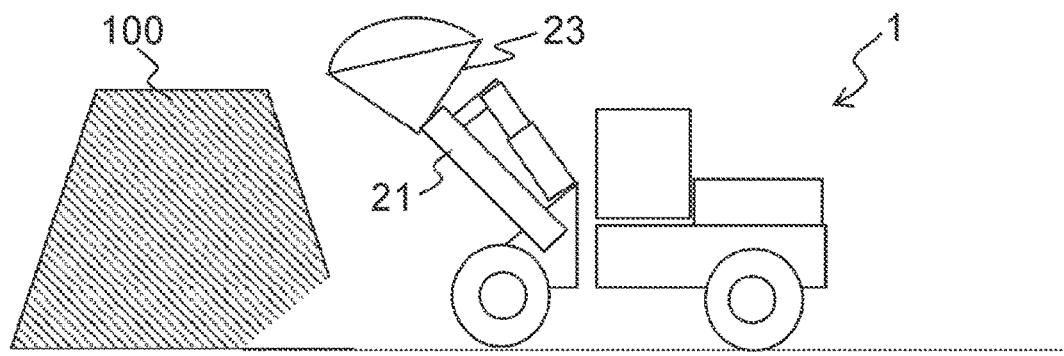

The series of operations illustrated in FIG. 2A to FIG. 2C is referred to as "excavation work". In the excavation work, the operation of the wheel loader 1 illustrated in FIG. 2A is referred to as "pushing bucket into ground". Furthermore, in the operations of the wheel loader 1 illustrated in FIG. 2B and FIG. 2C, a period during which the lifting operation of the lift arm 21 is performed by the operation of the operator is referred to as "excavation". Accordingly, at the time of scooping up the loads, when the lifting operation of the lift arm 21 is performed after tilting the bucket 23, the period after the time when the lifting operation of the lift arm 21 is started is referred to "excavation".
(Traveling Drive System)

Next, a traveling drive system of the wheel loader 1 will be described with reference to FIG. 3 to FIG. 5.

Figure 3:
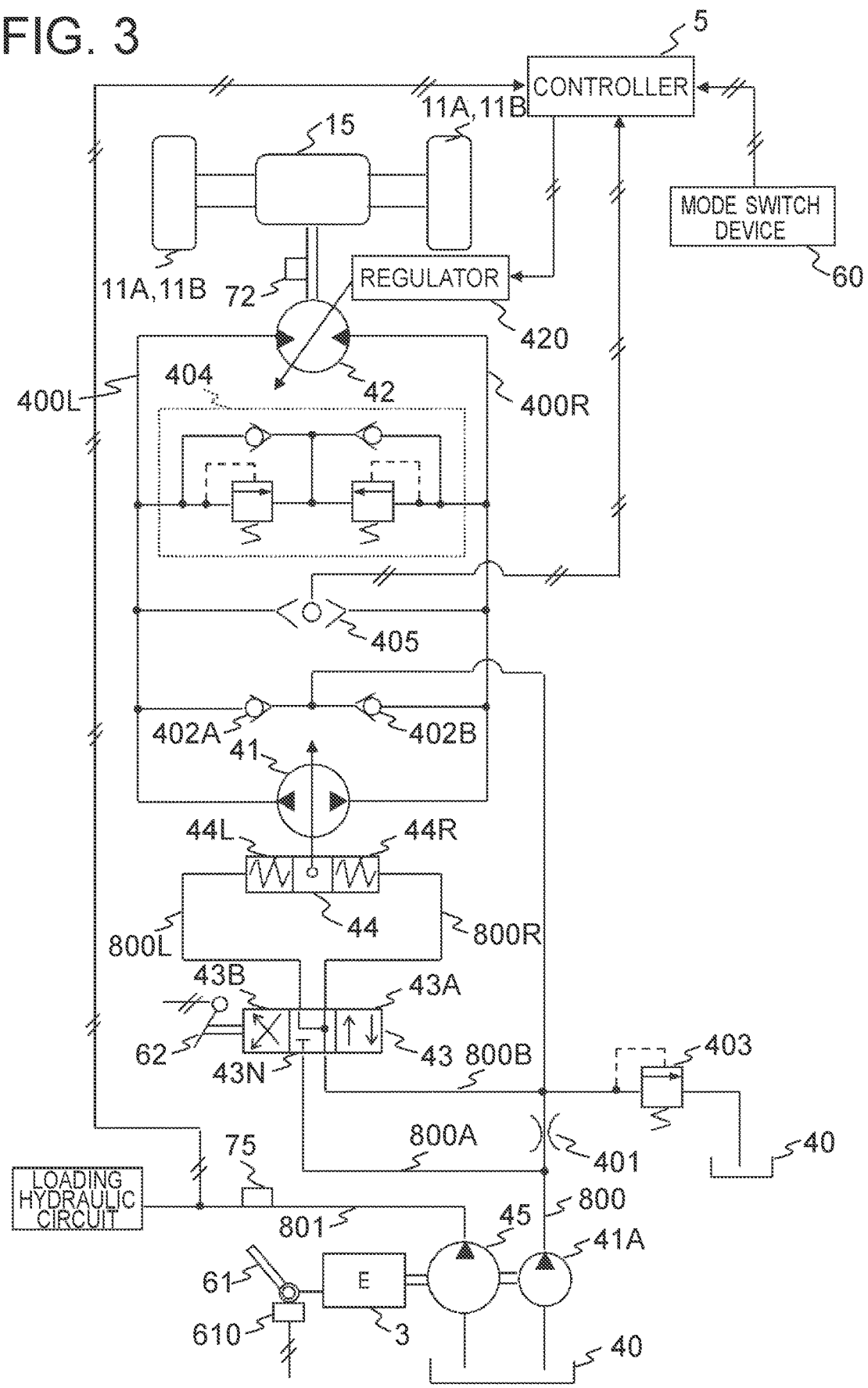
FIG. 3 illustrates a hydraulic circuit and an electric circuit according to traveling drive of a wheel loader.

FIG. 3 illustrates a hydraulic circuit and an electric circuit of the wheel loader 1. FIG. 4 illustrates a graph showing a relationship between a step-on amount of an accelerator pedal and target engine rotational speed. FIG. 5A illustrates a graph showing a relationship between engine rotational speed and a displacement volume of an HST pump 41, FIG. 5B illustrates a graph showing a relationship between the engine rotational speed and input torque of the HST pump 41, and FIG. 5C illustrates a graph showing a relationship between the engine rotational speed and a discharge flow rate of the HST pump 41.

The wheel loader 1 according to the present embodiment is provided with an HST traveling drive device including a hydraulic circuit which is a closed circuit. As illustrated in FIG. 3, the HST traveling drive device includes an engine 3, a hydraulic oil tank 40 that stores hydraulic oil, an HST pump 41 as a traveling hydraulic pump driven by the engine 3, an HST charge pump 41A that supplies hydraulic oil for controlling the HST pump 41, an HST motor 42 as a traveling hydraulic motor connected to the HST pump 41 via a pair of conduits 400L, 400R by a closed circuit, a forward/reverse changeover valve 43 for switching forward and reverse movement of the vehicle body, and a controller 5 for controlling each device such as the HST pump 41 and the HST motor 42.

The HST pump 41 is a swash plate type or swash shaft type variable displacement hydraulic pump of which displacement volume is controlled in accordance with a tilt angle. The tilt angle is adjusted by a tilt cylinder 44 which is driven by the hydraulic oil discharged from the HST charge pump 41A and acting thereon.

The HST motor 42 is a swash plate type or a swash shaft type variable displacement hydraulic motor of which displacement volume is controlled in accordance with a tilt angle, and transmits drive force of the engine 3 to the wheels 11A, 11B. The tilt angle is adjusted by a regulator 420 in accordance with a command signal output from the controller 5.

In the HST traveling drive device, firstly, the engine 3 is rotated when the operator steps on an accelerator pedal 61 provided in the operator's cab 12, and the HST pump 41 is driven by the drive force of the engine 3. Furthermore, the HST charge pump 41A is also driven by the drive force of the engine 3, and the hydraulic oil discharged from the HST charge pump 41A is guided to the tilt cylinder 44 via the forward/reverse changeover valve 43.

The forward/reverse changeover valve 43 is provided between the charge pump 41A and the tilt cylinder 44. The forward/reverse changeover valve 43 is connected to a discharge conduit 800 connected to a discharge side of the HST charge pump 41A by a pair of main conduits 800A, 800B. Furthermore, the forward/reverse changeover valve 43 is connected to left and right oil chambers 44L, 44R of the tilt cylinder 44 by a pair of pilot conduits 800L, 800R.

The forward/reverse changeover valve 43 includes a forward position 43A for making the vehicle body travel in the forward direction, a reverse position 43B for making the vehicle body travel in the reverse direction, and a neutral position 43N for stopping the vehicle body, and is operated by the forward/reverse changeover lever 62 provided in the operator's cab 12.

As illustrated in FIG. 3, when the forward/reverse changeover valve 43 is in the neutral position 43N, the hydraulic oil discharged from the HST charge pump 41A acts equally on the left and right oil chambers 44L, 44R of the tilt cylinder 44 via a throttle 401 provided on the main conduit 800B which is one of the main conduits 800A, 800B, respectively. Thus, since a rod of the tilt cylinder 44 is positioned in the neutral, the displacement volume of the HST pump 41 becomes 0 and a discharge amount of the HST pump 41 becomes 0. In this way, the vehicle body is brought to a stopped state.

On the other hand, when the forward/reverse changeover valve 43 is switched to the forward position 43A, the pressure on the upstream side of the throttle 401 acts on the left side oil chamber 44L of the tilt cylinder 44, and the pressure on the downstream side of the throttle 401 acts on the right side oil chamber 44R. Due to the pressure difference generated between the left and right oil chambers 44L, 44R, the rod of the tilt cylinder 44 is actuated in the right direction of FIG. 3. Accordingly, a tile angle of the HST pump 41 becomes wise and the hydraulic oil from the HST pump 41 is guided to the HST motor 42 through the conduit 400L, whereby the HST motor 42 is rotated in the forward direction to make the vehicle body travel in the forward direction.

On the other hand, when the forward/reverse changeover valve 43 is switched to the reverse position 43B, the pressure on the downstream side of the throttle 401 acts on the left side oil chamber 44L of the tilt cylinder 44, and the pressure on the upstream side of the throttle 401 acts on the right side oil chamber 44R. Due to the pressure difference generated between the left and right oil chambers 44L, 44R, the rod of the tilt cylinder 44 is actuated in the left direction of FIG. 3. Accordingly, the tilt angle of the HST pump 41 becomes wide and the hydraulic oil from the HST pump 41 is guided to the HST motor 42 via the conduit 400R, whereby the HST motor 42 is rotated in the reverse direction to make the vehicle body travel in the reverse direction.

Since the HST motor 42 is rotated by the hydraulic oil guided from the HST pump 41 as described above, output torque from the HST motor 42 is transmitted to the front wheels 11A and the rear wheels 11B via an axle 15 so as to make the wheel loader 1 travel. Therefore, the output torque of the HST motor 42 serves as the traveling drive force of the wheel loader 1, that is, the traction force of the vehicle body.

The output torque of the HST motor 42 is expressed by the product of the displacement volume (tilt angle) of the HST motor 42 and the traveling load pressure (=pressure of conduit 400L minus pressure of conduit 400R). Accordingly, it is possible to control the traction force of the vehicle body by controlling the displacement volume of the HST motor 42.

The rotational speed of the engine 3 is adjusted by a step-on amount of the accelerator pedal 61, and a discharge amount of the HST charge pump 41A connected to the engine 3 is proportional to the rotational speed of the engine 3. Therefore, the differential pressure between the front and the rear of the throttle 401 is proportional to the rotational speed of the engine 3, and the tilt angle of the HST pump 41 is also proportional to the rotational speed of the engine 3.

The step-on amount of the accelerator pedal 61 is detected by a step-on amount sensor 610 mounted on the accelerator pedal 61. The rotational speed of the engine 3 is controlled in accordance with target engine rotational speed corresponding to the step-on amount detected by the step-on amount sensor 610.

Figure 4:
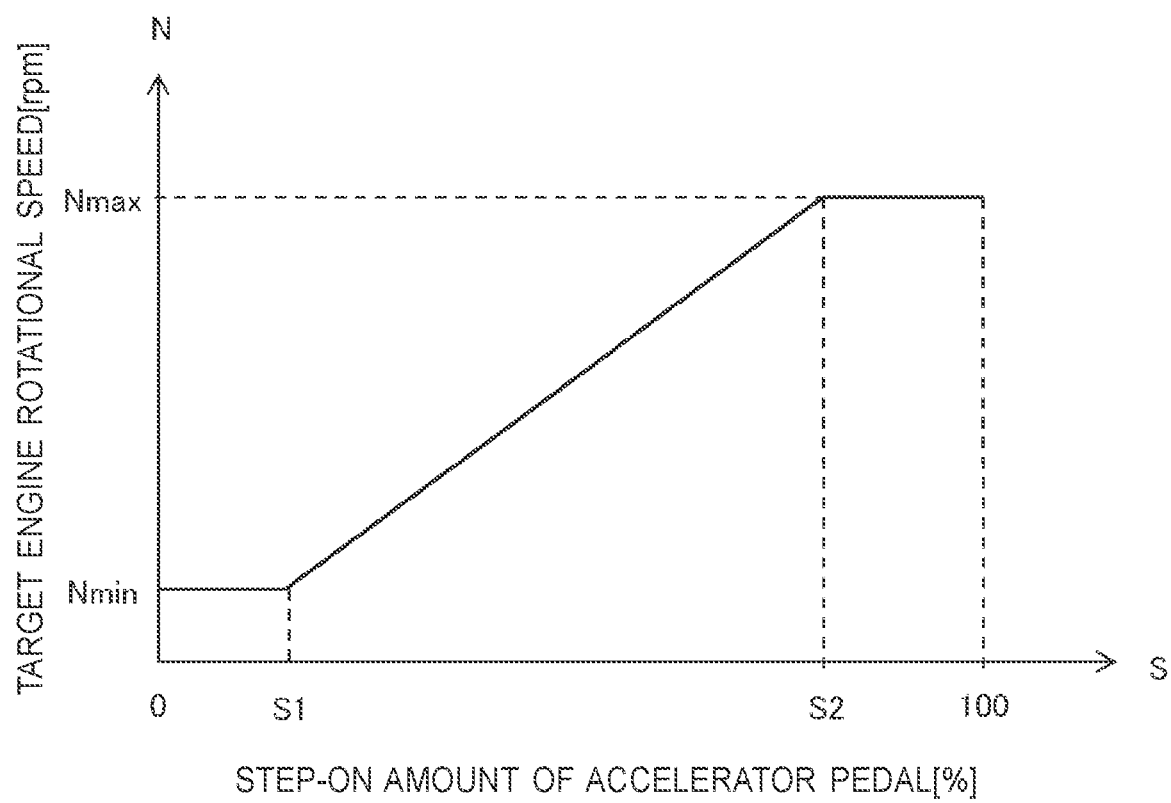
FIG. 4 illustrates a graph showing a relationship between a step-on amount of an accelerator pedal and target engine rotational speed.
Figure 5A:
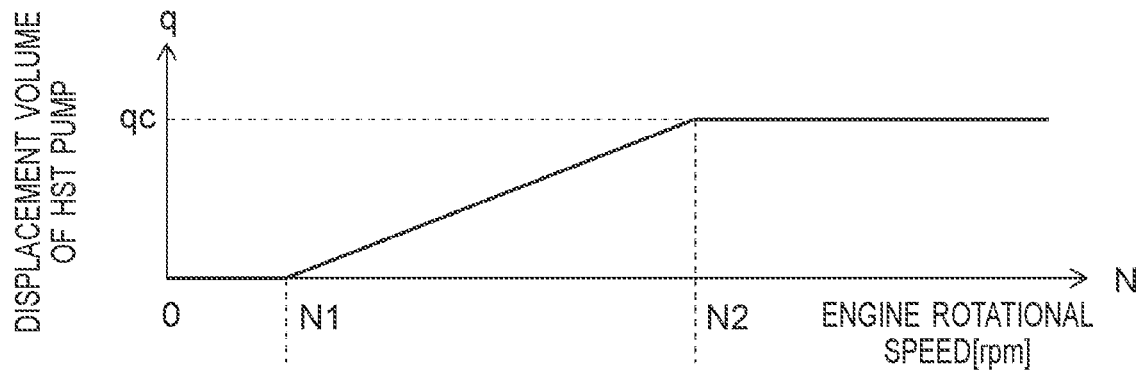
FIG. 5A illustrates a graph showing a relationship between engine rotational speed and a displacement volume of an HST pump.
Figure 5B:
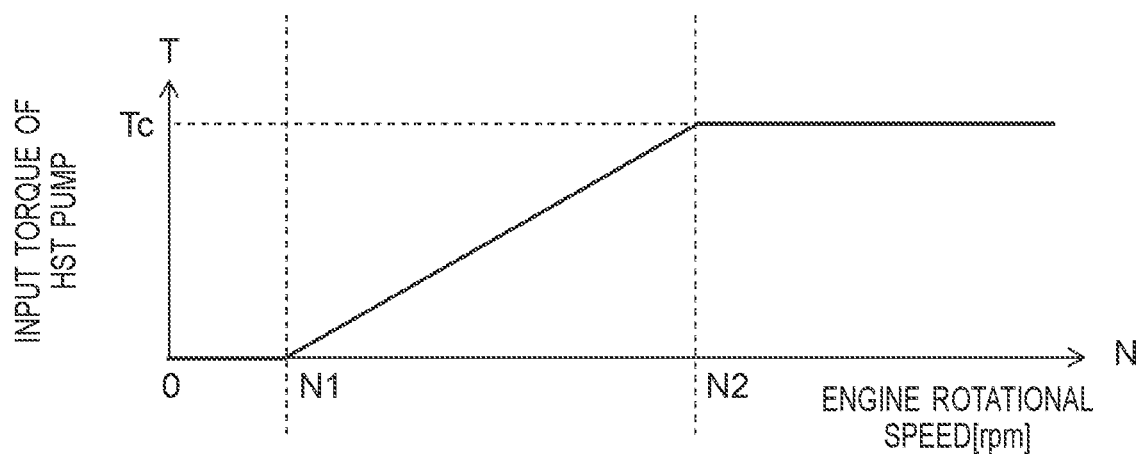
FIG. 5B illustrates a graph showing a relationship between the engine rotational speed and input torque of the HST pump.
Figure 5C:
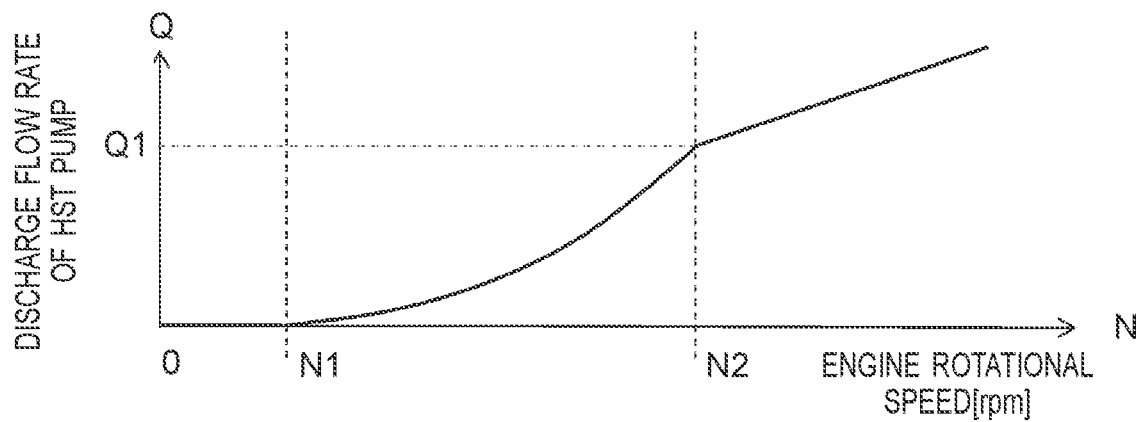
FIG. 5C illustrates a graph showing a relationship between the engine rotational speed and a discharge flow rate of the HST pump.

As illustrated in FIG. 4, the step-on amount of the accelerator pedal 61 is proportional to the target engine rotational speed. As the step-on amount of the accelerator pedal 61 increases, the target engine rotational speed also increases. When the step-on amount of the accelerator pedal 61 reaches S2, the target engine rotational speed becomes maximum rotational speed Nmax1.

In FIG. 4, a range where the step-on amount of the accelerator pedal 61 is 0 to S1 (for example, a range of 0% to 20% or 30%) is set as a dead zone in which the target engine rotational speed becomes constant at predetermined minimum rotational speed Nmin regardless of the step-on amount of the accelerator pedal 61. Furthermore, a range where the step-on amount of the accelerator pedal 61 is S2 to 100 (for example, a range of 70% or 80% to 100%) is set such that the target engine rotational speed is maintained at the maximum target engine rotational speed Nmax regardless of the step-on amount of the accelerator pedal 61. These ranges can be arbitrarily set and changed.

Next, the relationship between the engine 3 and the HST pump 41 is as illustrated in FIG. 5A to FIG. 5C.

As illustrated in FIG. 5A, in a range where the engine rotational speed is between N1 and N2, the rotational speed N of the engine 3 and the displacement volume q of the HST pump 41 are in a proportional relationship, and as the rotational speed of the engine 3 increases from N1 to N2 (N1<N2), the displacement volume increases from 0 to a predetermined value qc. When the engine rotational speed is N2 or higher, the displacement volume of the HST pump 41 becomes constant at the predetermined value qc regardless of the engine rotational speed.

The input torque of the HST pump 41 is obtained by multiplying the displacement volume and the discharge pressure (input torque=displacement volume×discharge pressure). As illustrated in FIG. 5B, in the range where the engine rotational speed is between N1 and N2, the rotational speed N of the engine 3 and the input torque T of the HST pump 41 are in a proportional relationship, and as the rotational speed of the engine 3 increases from N1 to N2, the input torque increases from 0 to a predetermined value Tc. When the engine rotational speed is N2 or higher, the input torque of the HST pump 41 becomes constant at the predetermined value Tc regardless of the engine rotational speed.

As illustrated in FIG. 5C, in the range where the engine rotational speed is between N1 and N2, the discharge flow rate Q of the HST pump 41 and the rotational speed N of the engine 3 are in a quadratically proportional relationship, and as the rotational speed of the engine 3 increases from N1 to N2, the discharge flow rate of the HST pump 41 increases from 0 to Q1. When the engine rotational speed is N2 or higher, the rotational speed N of the engine 3 and the discharge flow rate Q of the HST pump 41 is in a proportional relationship.

As the rotational speed N of the engine 3 increases, the discharge flow rate Q of the HST pump 41 increases and a flow rate of the hydraulic oil flowing from the HST pump 41 into the HST motor 42 increases, and accordingly, the rotational speed of the HST motor 42 increases and the vehicle speed increases. The vehicle speed is detected as the rotational speed of the HST motor 42 by a motor rotational speed sensor 72 (see FIG. 3).

As described above, in the HST traveling drive device, the vehicle speed is controlled by continuously increasing or decreasing the discharge flow rate of the HST pump 41 (speed change), thereby making it possible for the wheel loader 1 to start traveling smoothly and stop with less impact.

As illustrated in FIG. 3, the hydraulic oil discharged from the HST charge pump 41A is also guided to the conduits 400L, 400R via the throttle 401 and check valves 402A, 402B. The pressure on the downstream side of the throttle 401 is limited by a charge relief valve 403 provided on a conduit connecting the forward/reverse changeover valve 43 and the hydraulic oil tank 40, and the maximum pressure in the conduits 400L, 400R is limited by a relief valve 404.

The HST traveling drive device according to the present embodiment is provided with a high-pressure selection valve 405 for selecting the higher pressure out of the conduit pressure in the conduits 400L, 400R that guide the hydraulic oil from the HST pump 41 to the HST motor 42. The pressure selected by the high-pressure selection valve 405 is input to the controller 5.

Furthermore, the wheel loader 1 includes a mode switch device 60 provided in the operator's cab 12 for switching between a limit mode for limiting the maximum traction force (traveling drive force) of the wheel loader 1 and a normal mode for not limiting the maximum traction force of the wheel loader 1. A switch signal from the mode switch device 60 is input to the controller 5.

(Drive System of Work Device 2)

Next, the drive system of the work device 2 will be described with reference to FIG. 3, FIG. 6, and FIG. 7.

Figure 6:
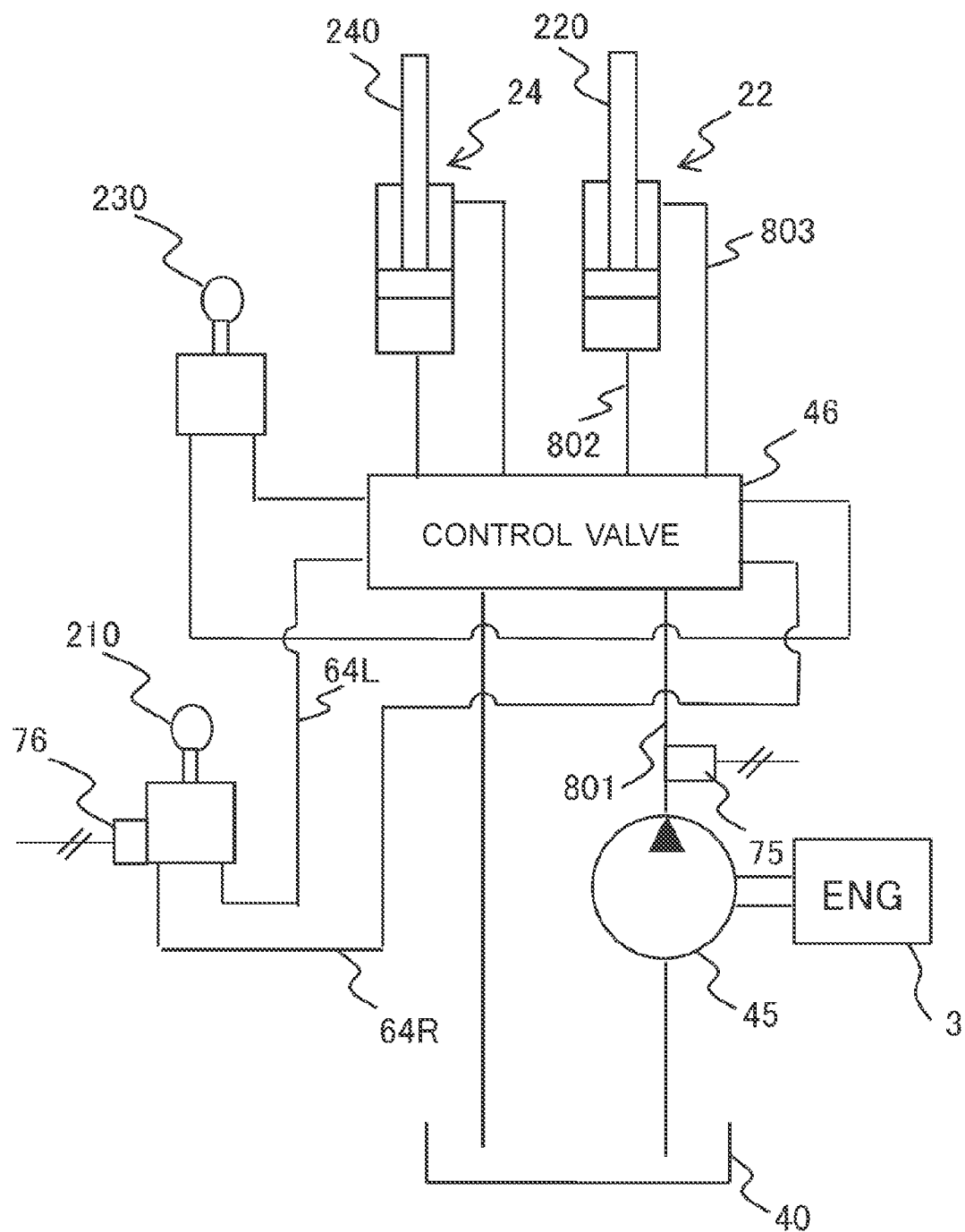
FIG. 6 illustrates a hydraulic circuit according to drive of a work device.

FIG. 6 illustrates a hydraulic circuit according to drive of the work device 2. FIG. 7 illustrates a graph showing a relationship between the discharge pressure of a loading hydraulic pump 45 and spool opening area.

As illustrated in FIG. 3 and FIG. 6, the wheel loader 1 includes the loading hydraulic pump 45 that is driven by the engine 3 to supply the hydraulic oil to the work device 2, a control valve 46 that is provided between each of the lift arm cylinders 22 and the bucket cylinder 24 and the loading hydraulic pump 45 to control a flow of the hydraulic oil supplied from the loading hydraulic pump 45 to the lift arm cylinders 22 and the bucket cylinder 24, respectively, a lift arm operation lever 210 for operating the lift arm 21, and a bucket operation lever 230 for operating the bucket 23.

In the present embodiment, a fixed hydraulic pump is used as the loading hydraulic pump 45. As illustrated in FIG. 6, the loading hydraulic pump 45 is connected to the control valve 46 by a first conduit 801. The discharge pressure from the loading hydraulic pump 45 is detected by a discharge pressure sensor 75 provided on the first conduit 801, and a signal relating to the detected discharge pressure is input to the controller 5. The discharge pressure sensor 75 is one of the aspects of a discharge pressure detection sensor for detecting the discharge pressure of the loading hydraulic pump 45.

Each of the lift arm operation lever 210 and the bucket operation lever 230 is one of the aspects of an operation device for operating the work device 2, and provided in the operator's cab 12 (see FIG. 1). For example, when the operator operates the lift arm operation lever 210, pilot pressure proportional to its operation amount is generated as an operation signal.

As illustrated in FIG. 6, the generated pilot pressure is guided to a pair of pilot conduits 64L, 64R connected to a pair of pressure receiving chambers of the control valve 46 to act on the control valve 46. Thus, the spool in the control valve 46 strokes in accordance with the pilot pressure, and a flowing direction and a flow rate of the hydraulic oil is determined. The control valve 46 is connected to a bottom chamber of each of the lift arm cylinders 22 by a second conduit 802, and is connected to a rod chamber of each of the lift arm cylinders 22 by a third conduit 803.

The hydraulic oil discharged from the loading hydraulic pump 45 is guided to the first conduit 801, and is further guided to the second conduit 802 or the third conduit 803 via the control valve 46. When being guided to the second conduit 802, the hydraulic oil flows into the bottom chamber of each of the lift arm cylinders 22, whereby the rod 220 of each of the lift arm cylinders 22 is extended to raise the lift arm 21. On the other hand, when being guided to the third conduit 803, the hydraulic oil flows into the rod chamber of each of the lift arm cylinders 22, whereby the rod 220 of each of the lift arm cylinders 22 is contracted to lower the lift arm 21.

As illustrated in FIG. 6, the lift arm operation amount of the lift arm operation lever 210 is detected by an operation amount sensor 76 mounted on the lift arm operation lever 210. The operation amount sensor 76 is one of the aspects of an operation amount detection sensor for detecting an operation amount of the lift arm operation lever 210 which is an operation device.

In the present embodiment, each of the lift arm operation lever 210 and the bucket operation lever 230 is a hydraulic lever, respectively. Meanwhile, an electric lever may be used therefor, and in such a case, a current value corresponding to an operation amount is generated as an operation signal.

Figure 7:
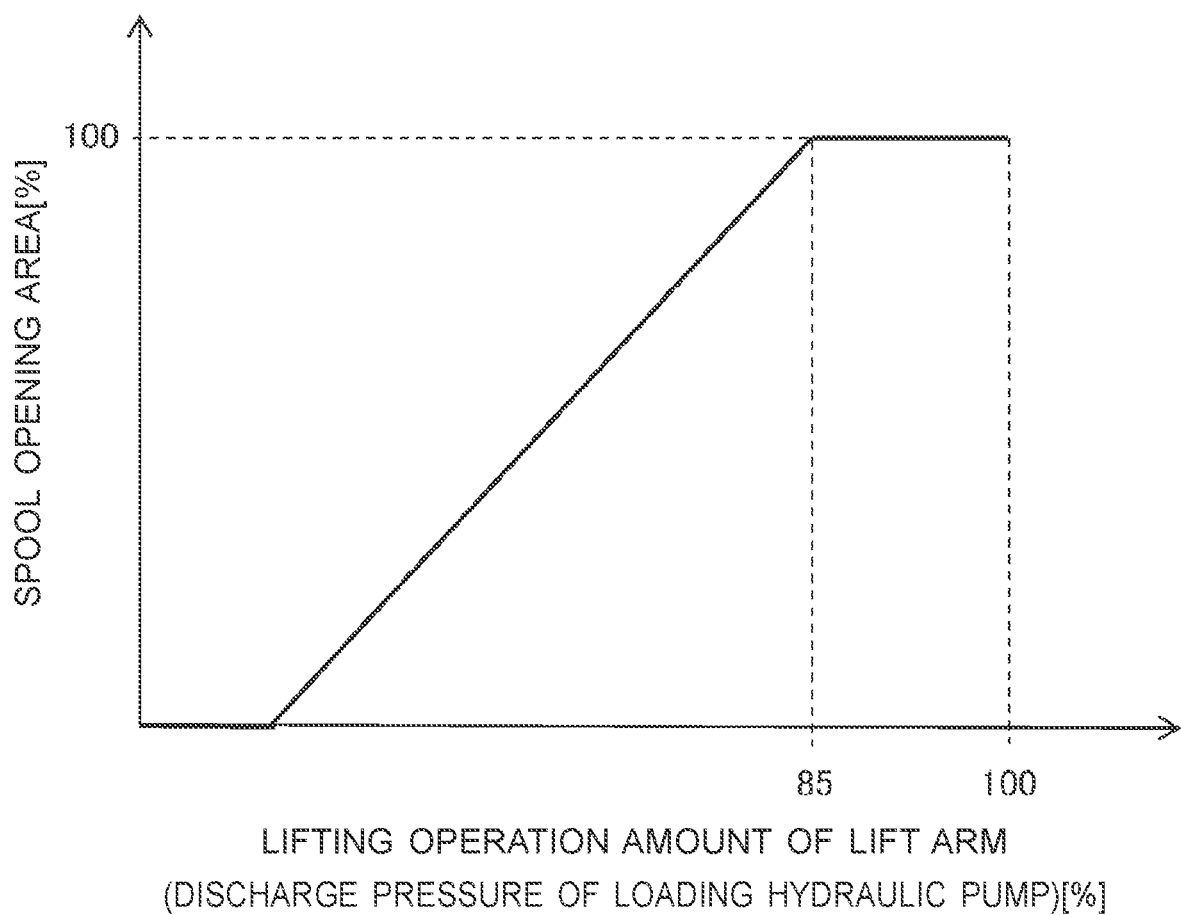
FIG. 7 illustrates a graph showing a relationship between discharge pressure of a loading hydraulic pump and spool opening area.

As illustrated in FIG. 7, the lifting operation amount of the lift arm operation lever 210 and the spool opening area of the control valve 46 are in a proportional relationship, and as the lifting operation amount of the lift arm operation lever 210 increases, the spool opening area also increases. Accordingly, when the lift arm operation lever 210 is operated largely in the direction of raising the lift arm 21, the amount of the hydraulic oil flowing into the bottom chamber of each of the lift arm cylinders 22 increases and the rod 220 is extended quickly. That is, as the operation amount of the lift arm operation lever 210 increases, operation speed of the lift arm 21 also increases.

In FIG. 7, a range where the lifting operation amount of the lift arm operation lever 210 is 0% to 10% is set as a dead zone in which the spool does not open and the opening area becomes 0% even when the lift arm operation lever 210 is operated. Furthermore, a range where the lifting operation amount of the lift arm operation lever 210 is 85% to 100%, the spool opening area is constant at 100% and a full lever operation state is maintained. These ranges can be arbitrarily set and changed.

Here, the discharge pressure of the loading hydraulic pump 45 and the operation amount of the lift arm operation lever 210 are indices for an operation of the lift arm 21, respectively. Each of the discharge pressure sensor 75 and the operation amount sensor 76 is one of the aspects of an operation detection sensor for detecting an operation of the lift arm 21 by the lift arm operation lever 210.

In order to accurately detect the operation of the lift arm 21, it is preferable to use the respective values detected by both the discharge pressure sensor 75 and the operation amount sensor 76. Meanwhile, as the operation detection sensor, it is sufficient to use at least one of the discharge pressure sensor 75 and the operation amount sensor 76.

Similarly to the operation of the lift arm 21, as for the operation of the bucket 23, the pilot pressure generated in accordance with the operation amount of the bucket operation lever 230 acts on the control valve 46, whereby the spool opening area of the control valve 46 is controlled to adjust the amount of the hydraulic oil flowing into and out of the bucket cylinder 24. Although not illustrated in FIG. 6, sensors for detecting an operation of the bucket 23 and the like are provided on each conduit of the hydraulic circuit.

(Configuration of Controller 5)

Next, the configuration of the controller 5 will be described with reference to FIG. 8.

Figure 8:
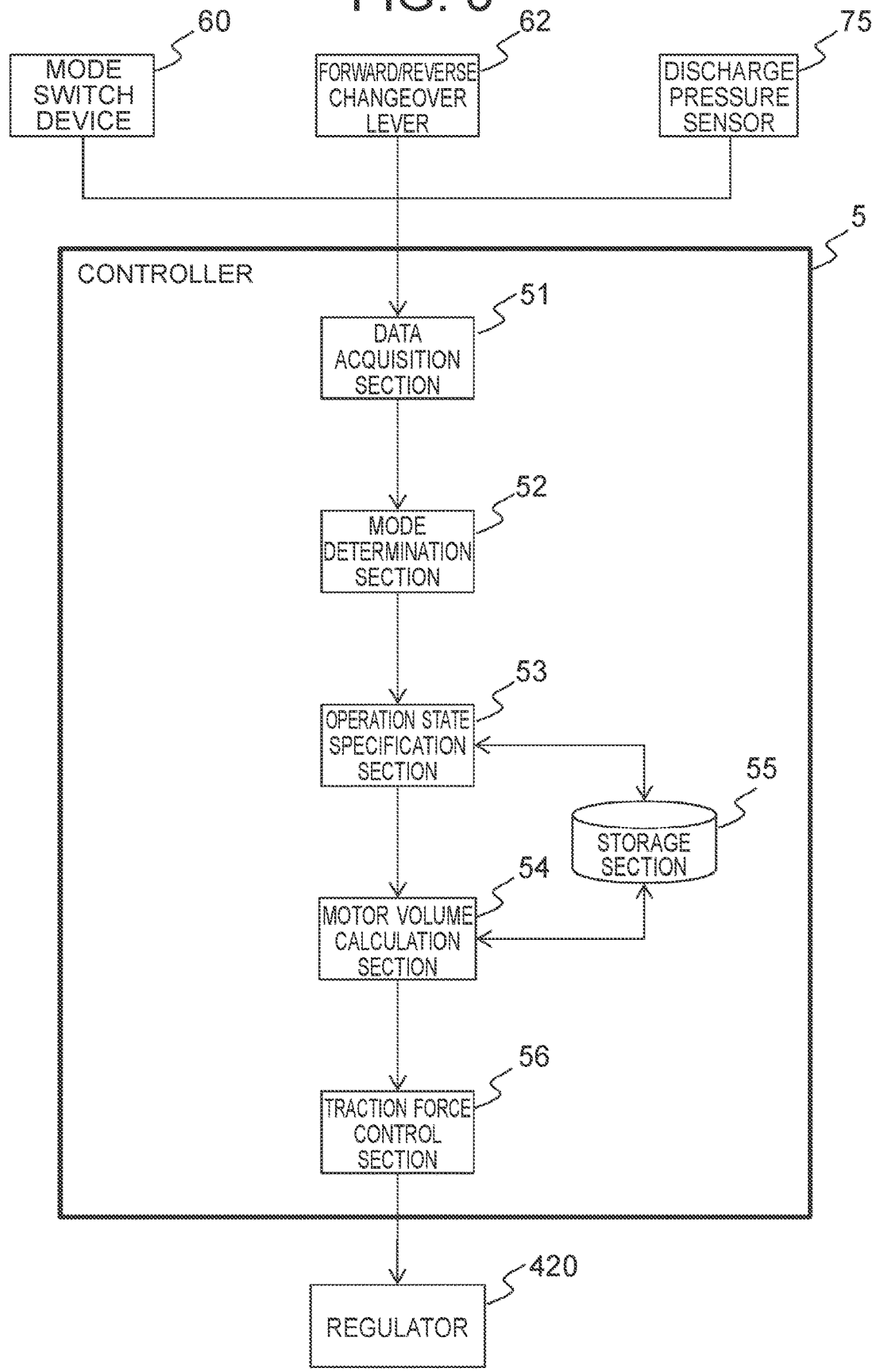
FIG. 8 is a functional block diagram illustrating functions of a controller.

FIG. 8 is a functional block diagram illustrating the functions of the controller 5.

The controller 5 is configured such that a CPU, a RAM, a ROM, an HDD, an input I/F, and an output I/F are connected to each other via a bus. Various operation devices such as the mode switch device 60 and the forward/reverse changeover lever 62 and various sensors such as the discharge pressure sensor 75 are connected to the input I/F. The regulator 420 of the HST motor 42 and the like is connected to the output I/F.

In this hardware configuration, the CPU reads out an arithmetic program (software) stored in a recording medium such as the ROM, the HDD, or an optical disk, expands it on the RAM, and executes the expanded arithmetic program. Thereby, the control program and the hardware are operated in cooperation, which realizes the functions of the controller 5.

In the present embodiment, the controller 5 is described by a combination of software and hardware. Meanwhile, the present invention is not limited thereto, but an integrated circuit that realizes the functions of a control program executed on the side of the wheel loader 1 may be used.

As illustrated in FIG. 8, the controller 5 includes a data acquisition section 51, a mode determination section 52, an operation state specification section 53, a motor volume calculation section 54, a storage section 55, and a traction force control section 56.

The data acquisition section 51 is configured to acquire data relating to a mode switch signal output from the mode switch device 60, an operation direction of the forward/reverse changeover lever 62, and the discharge pressure Pa of the loading hydraulic pump 45 detected by the discharge pressure sensor 75, respectively.

The mode determination section 52 is configured to determine whether the limit mode is selected based on the mode switch signal acquired by the data acquisition section 51.

The operation state specification section 53 is configured to specify an operation state of the wheel loader 1 based on the operation direction of the forward/reverse changeover lever 62 and the discharge pressure of the loading hydraulic pump 45 acquired by the data acquisition section 51 when the mode determination section 52 determines that the limit mode is selected. Specifically, the operation state specification section 53 specifies a traveling state of the wheel loader 1 based on the operation direction of the forward/reverse changeover lever 62, and specify an operation state of the work device 2 based on the discharge pressure of the loading hydraulic pump 45 so as to specify the operation state of the wheel loader 1 as a whole.

In the present embodiment, the traveling state of the wheel loader 1 is detected based on the operation direction of the forward/reverse changeover lever 62. In this connection, for example, the operation direction of the forward/reverse changeover lever 62 can be detected by detecting a forward/reverse changeover signal corresponding to the operation direction output from the forward/reverse changeover lever 62, or detecting which direction, namely in the forward direction or the reverse direction, the traveling direction of the vehicle body is based on the rotation direction of a propeller shaft. In this connection, the sensor for detecting the operation direction of the forward/reverse changeover lever 62 is one of the aspects of a traveling state detection sensor for detecting the traveling state of the wheel loader 1. Meanwhile, the present embodiment is not limited thereto, and the traveling state of the wheel loader 1 may be specified by using data detected by other traveling state detection sensors mounted on the vehicle body (for example, step-on amount of the accelerator pedal 61 detected by the step-on amount sensor 610).

The motor volume calculation section 54 is configured to calculate a maximum displacement volume q1 (hereinafter referred to as "first maximum displacement volume q1") of the HST motor 42 at which the maximum traction force of the wheel loader 1 becomes a first set value when the operation state specification section 53 specifies that the vehicle body is traveling in a state of not performing the lifting operation of the work device 2. Furthermore, when the operation state specification section 53 specifies that the work device 2 starts excavating the natural ground 100, the motor volume calculation section 54 calculates a maximum displacement volume q2 (hereinafter referred to as "second maximum displacement volume q2") of the HST motor 42 at which the maximum traction force of the wheel loader 1 becomes a second set value.

Here, the case where "it is specified that the vehicle body is traveling in a state of not performing the lifting operation of the work device 2" corresponds to the case where the bucket 23 is pushed into the natural ground 100 or the case where the dozing operation (soil pushing operation) for pushing the road surface to level the natural ground by using the work device 2 (bucket 23) is performed.

In the present embodiment, the "state of not performing the lifting operation of the work device 2" indicates a state where the lifting operation of the lift arm 21 is not performed, but does not include the presence or absence of the operation of the bucket 23. For example, in the actual dozing work, the operator operates the bucket operation lever 230 to slightly change the angle of the bucket 23, but this operation of the bucket 23 is specified as "a state of not performing the lifting operation of the work device 2" by the operation state specification section 53.

The "first set value" is a value set based on a static friction coefficient $\mu$ between the road surface and the wheels 11A, 11B, as well as the weight of the vehicle body (hereinafter referred to as "vehicle weight"). The second set value is a value set based on the static friction coefficient $\mu$ between the road surface and the wheels 11A, 11B, the vehicle weight, and digging force of the work device 2 (lift arm 21). The second set value is greater than the first set value (second set value>first set value).

For example, in the case where the wheel loader 1 works on a slippery road surface of which the static frictional coefficient $\mu$ with the wheels 11A, 11B is 0.4 to 0.5 ($\mu$=0.4 to 0.5), at the time of pushing the bucket 23 into the natural ground 100 or performing the dozing operation, the maximum traction force of the wheel loader 1 is set to 40% to 50% of the vehicle weight as the first set value.

On the other hand, during the excavation operation, when the digging force of the work device 2 is 70% of the vehicle weight, the maximum traction force of the wheel loader 1 is set to 50% to 70% of the vehicle weight as the second set value. That is, the maximum traction force of the wheel loader 1 during the excavation operation is set greater than the maximum traction force of the wheel loader 1 at the time of pushing the bucket 23 into the natural ground 100 or performing the dozing work. This is because, by performing the lifting operation of the lift arm 21 at the time of excavation, the digging force of the lift arm 21 acts against the wheels 11A, 11B in addition to its own weight (vehicle weight). Accordingly, even when increasing the maximum traction force during the excavation operation more than that at the time of pushing the bucket 23 into the natural ground 100 or performing the dozing work, slippage of the wheels 11A, 11B hardly occurs, thereby realizing the excavation operation without lowering its efficiency.

The storage section 55 is configured to store a first threshold P1 and a second threshold P2 which relate to the operation amount (discharge pressure of the loading hydraulic pump 45) necessary for the lifting operation of the lift arm 21, respectively. The first threshold P1 is the discharge pressure of the loading hydraulic pump 45 when the wheel loader 1 starts excavation by the work device 2. The second threshold P2 is the discharge pressure of the loading hydraulic pump 45 when the lift arm 21 is in a horizontal posture during the excavation operation. The storage section 55 stores the first set value and the second set value, respectively.

The traction force control section 56 is configured to output, to the regulator 420 of the HST motor 42, a command signal based on the first maximum displacement volume q1 calculated by the motor volume calculation section 54 so as to limit the maximum displacement volume qmax of the HST motor 42 to the first maximum displacement volume q1 when the operation state specification section 53 specifies that the vehicle body is traveling in a state of not performing the lifting operation of the work device 2.

On the other hand, the traction force control section 56 outputs, to the regulator 420 of the HST motor 42, a command signal based on the second maximum displacement volume q2 calculated by the motor volume calculation section 54 so as to increase the maximum displacement volume qmax of the HST motor 42 to the second maximum displacement volume q2 as the discharge pressure Pa of the loading hydraulic pump 45 increases when the operation state specification section 53 specifies that the work device 2 starts excavating the natural ground 100.

In the case where the operation state specification section 53 specifies that the work device 2 is excavating the natural ground 100, when the discharge pressure Pa of the loading hydraulic pump 45 is equal to or more than the second threshold P2, the traction force control section 56 maintains the maximum displacement volume qmax of the HST motor 42 at the second maximum displacement volume q2 (constant value), regardless of increase in the discharge pressure Pa of the loading hydraulic pump 45.

(Processing in Controller 5 and Operation of Wheel Loader 1)

Next, a specific flow of processing executed in the controller 5 and the operation of the wheel loader 1 in accordance with control of the controller 5 will be described with reference to FIG. 9 and FIG. 10.

Figure 9:
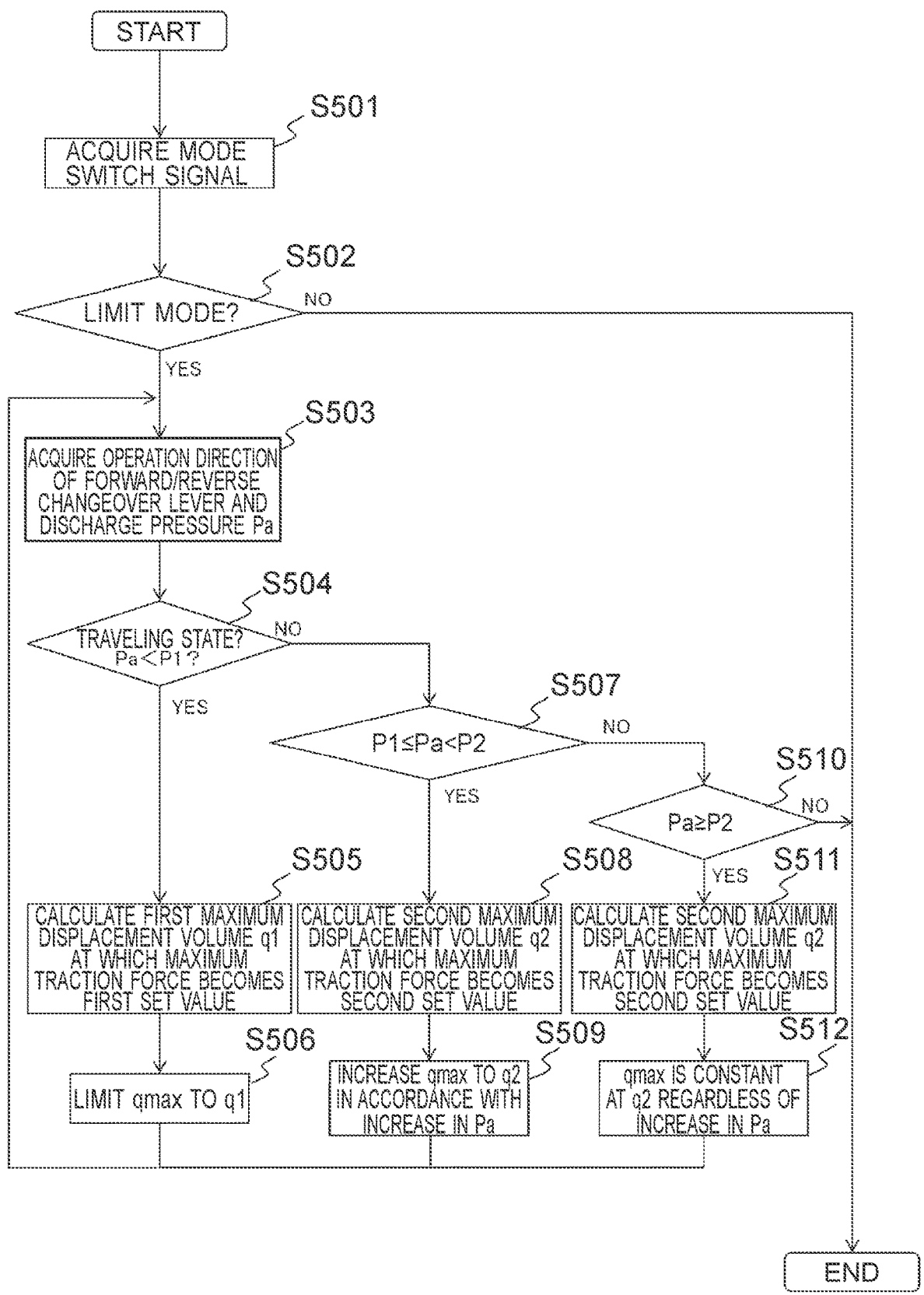
FIG. 9 illustrates a flowchart of processing executed by a controller.

FIG. 9 illustrates a flowchart of the processing executed by the controller 5. FIG. 10 illustrates a graph showing a relationship between the discharge pressure Pa of the loading hydraulic pump 45 and the maximum displacement volume qmax of the HST motor 42.

Firstly, the data acquisition section 51 acquires a mode switch signal output from the mode switch device 60 (step S501). Next, the mode determination section 52 determines whether the limit mode is selected based on the mode switch signal acquired in step S501 (step S502).

When it is determined in step S502 that the limit mode is selected (step S502/YES), the data acquisition section 51 acquires the operation direction of the forward/reverse changeover lever 62 and the discharge pressure Pa of the loading hydraulic pump 45 output from the discharge pressure sensor 75, respectively (step S503).

Next, the operation state specification section 53 determines whether the vehicle body is in the traveling state based on the operation direction of the forward/reverse changeover lever 62 acquired in step S503, and determines whether the discharge pressure Pa is smaller than the first threshold P1 based on the discharge pressure Pa acquired in step S503 (step S504).

When it is determined in step S504 that the vehicle body is in the traveling state and the discharge pressure Pa is smaller than the first threshold P1 (Pa<P1) (step S504/YES), in other words, when it is specified that the vehicle body is traveling in the state of not performing the lifting operation of the work device 2, the motor volume calculation section 54 calculates the first maximum displacement volume q1 at which the maximum traction force of the wheel loader 1 becomes the first set value (step S505).

Then, the traction force control section 56 outputs, to the regulator 420 of the HST motor 42, a command signal based on the first maximum displacement volume q1 calculated in step S505 so as to limit the maximum displacement volume qmax of the HST motor 42 to the first maximum displacement volume q1 (step S506). Thus, the maximum traction force of the wheel loader 1 is limited to the first set value.

When it is not determined in step S504 that the vehicle body is traveling and the discharge pressure Pa is smaller than the first threshold P1 (step S504/NO), the operation state specification section 53 determines whether the discharge pressure Pa acquired in step S503 is equal to or greater than the first threshold P1 as well as is smaller than the second threshold P2 (step S507).

When it is determined in step S507 that the discharge pressure Pa is equal to or greater than the first threshold P1 and is smaller than the second threshold P2 (P1≤Pa<P2) (step S507/YES), in other words, when it is specified that the work device 2 starts excavating the natural ground 100, the motor volume calculation section 54 calculates the second maximum displacement volume q2 at which the maximum traction force of the wheel loader 1 becomes the second set value (step S508).

Then, the traction force control section 56 outputs, to the regulator 420 of the HST motor 42, a command signal based on the second maximum displacement volume q2 calculated in step S508 so as to increase the maximum displacement volume qmax of the HST motor 42 to the second maximum displacement volume q2 as the discharge pressure Pa increases (step S509). Thus, the maximum traction force of the wheel loader 1 increases from the first set value to the second set value.

When it is not determined in step S507 that the discharge pressure Pa is equal to or greater than the first threshold P1 as well as is smaller than the second threshold P2 (step S507/NO), the operation state specification section 53 determines whether the discharge pressure Pa acquired in step S503 is equal to or greater than the second threshold P2 (step S510).

When it is determined in step S510 that the discharge pressure Pa is equal to or greater than the second threshold P2 (Pa≥P2) (step S510/YES), similarly to step S508, the motor volume calculation section 54 calculates the second maximum displacement volume q2 at which the maximum traction force of the wheel loader 1 becomes the second set value (step S511).

Then, the traction force control section 56 outputs, to the regulator 420 of the HST motor 42, a command signal based on the second maximum displacement volume q2 calculated in step S508 so as to increase the maximum displacement volume qmax of the HST motor 42 to the second maximum displacement volume q2 regardless of increase in the discharge pressure Pa (step S512). Thus, the maximum traction force of the wheel loader 1 is maintained at the second set value as a constant value.

Upon completion of step S506, step S509, and step S512, the controller 5 returns to step S503. When it is determined in step S502 that the limit mode is not selected, in other words, when it is determined that the normal mode is selected (step S502/NO), or when it is not determined in step S510 that the discharge pressure Pa is equal to or greater than the second threshold P2, in other words, when both the vehicle body and the work device 2 are out of operation (step S510/NO), the processing in the controller 5 is terminated.

Figure 10:
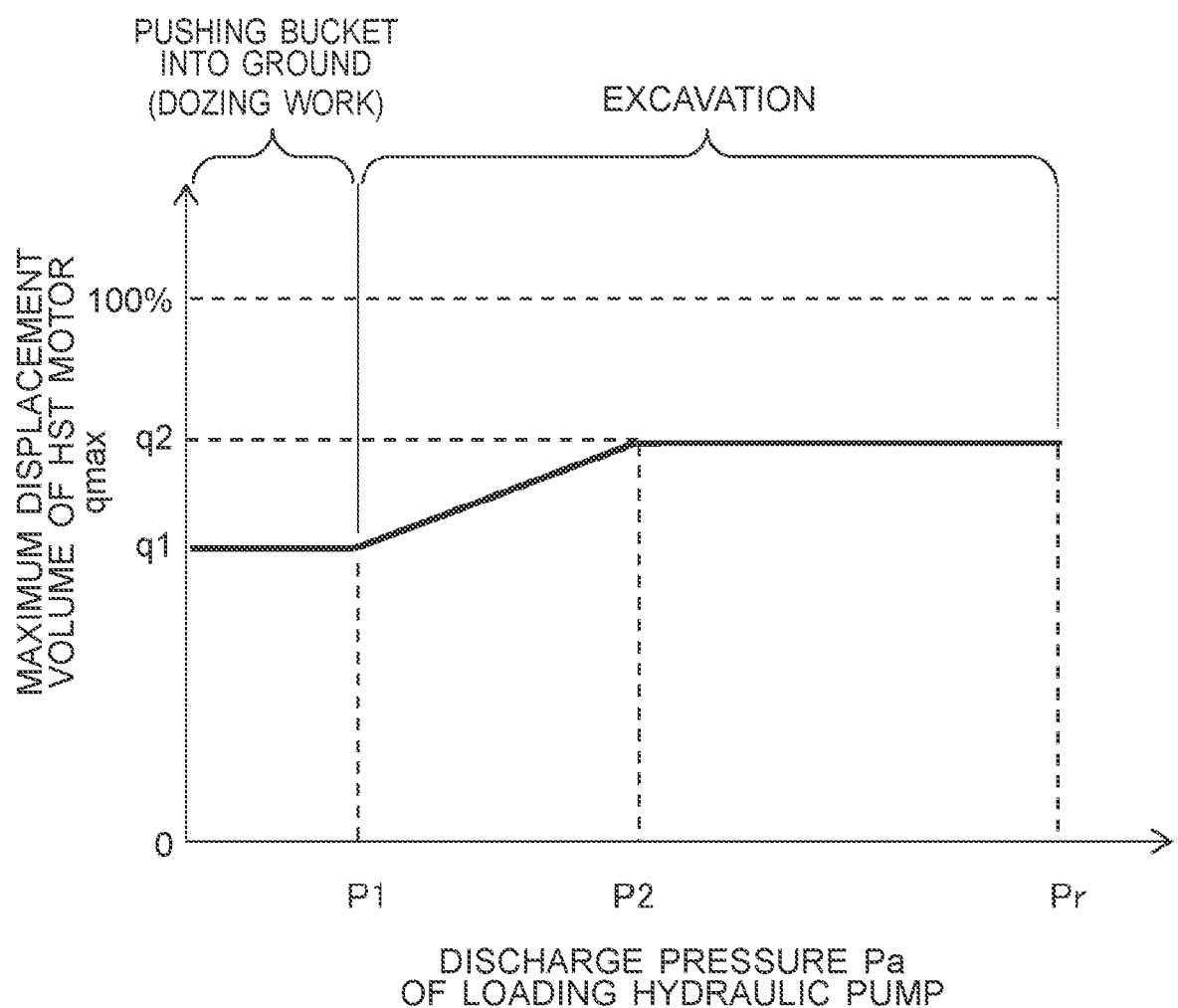
FIG. 10 illustrates a graph showing a relationship between discharge pressure of a loading hydraulic pump and a maximum displacement volume of an HST motor.

As described above, when the limit mode is selected by the mode switch device 60, at the time of pushing the bucket 23 into the natural ground 100 or performing the dozing work in which the discharge pressure Pa of the loading hydraulic pump 45 is 0 or more as well as less than P1 (0≤Pa<P1), as illustrated in FIG. 10, the maximum displacement volume qmax of the HST motor 42 is limited to the first maximum displacement volume q1, in other words, the maximum traction force is limited to the first set value. Accordingly, even on a slippery road surface, slippage of the wheels 11A, 11B hardly occurs, and thus the working efficiency is improved.

Furthermore, at the time of performing excavation of the natural ground 100, which is an operation of the wheel loader 1 in which the discharge pressure Pa of the loading hydraulic pump 45 is equal to or greater than P1 (Pa≤P1), the maximum displacement volume qmax of the HST motor 42 is made to increase from the first maximum displacement volume q1 to the second maximum displacement volume q2, that is, the maximum traction force is made to increase from the first set value to the second set value. Accordingly, even on a slippery road surface, the traction force can be maintained while slippage of the wheels 11A, 11B is suppressed, and thus it becomes easy to perform excavation.

According to the wheel loader 1 of the present embodiment, even in the case of working on a slippery road surface, the maximum traction force can be controlled based on the static friction coefficient μ between the road surface and the wheels 11A, 11B as well as the operation content, so that the operator can perform operations of pushing a bucket into the ground, excavating, or dozing without concerning about slippage of the wheels 11A, 11B. Accordingly, it is possible to provide the operator with ride comfort and reduction in his or her fatigue.

In this connection, as illustrated in FIG. 10, on the slippery road surface, even if the discharge pressure Pa of the loading hydraulic pump 45 becomes the relief pressure Pr, slippage of the wheels 11A, 11B occurs when the maximum displacement volume of the HST motor 42 is set to a rated value (100%) of the maximum displacement volume in the normal mode. Accordingly, it is preferable to keep the maximum displacement volume of the HST motor 42 at the second maximum displacement volume q2 or less.

In the above, the embodiment of the present invention has been described. It should be noted that the present invention is not limited to the embodiment and modifications described above, and various modifications are included. For example, the embodiment described above has been explained in detail in order to clarify the present invention, but is not necessarily limited to those having all the configurations described. In addition, a part of the configuration of the present embodiment can be replaced with that of other embodiments, and the configuration of other embodiments can be added to the configuration of the present embodiment. Furthermore, it is possible to add, delete, or replace another configuration with respect to a part of the configuration of the present embodiment.

For example, in the embodiment described above, as the loading hydraulic pump 45, a fixed displacement hydraulic pump is used. Meanwhile, the present embodiment is not limited thereto, and a variable displacement hydraulic pump may be used therefor.

Furthermore, in the embodiment described above, the maximum traction force of the wheel loader 1 is controlled by adjusting the maximum displacement volume qmax of the HST motor 42. Meanwhile, the present embodiment is not limited thereto, and for example, the maximum traction force of the wheel loader 1 may be controlled by adjusting the displacement volume of the HST pump 41.

REFERENCE SIGNS LIST

1: wheel loader (loading work vehicle)
2: work device
3: engine
5: controller
11A: front wheel (wheel)
11B: rear wheel (wheel)
21: lift arm
23: bucket (attachment)
41: HST pump (traveling hydraulic pump)
42: HST motor (traveling hydraulic motor)
45: loading hydraulic pump
60: mode switch device
62: forward/reverse changeover lever (traveling state detection sensor)
75: discharge pressure sensor (discharge pressure detection sensor, operation detection sensor)
76: operation amount sensor (operation amount detection sensor, operation detection sensor)
100: natural ground (object to be excavated)
210: lift arm operation lever (operation device)
230: bucket operation lever (operation device)
610: step-on amount sensor (traveling state detection sensor)
μ: static friction coefficient

The invention claimed is:

1. A loading work vehicle comprising:
   a plurality of wheels;
   an engine;
   a variable displacement type traveling hydraulic pump driven by the engine;
   a variable displacement type traveling hydraulic motor that is connected to the traveling hydraulic pump by a closed circuit and transmits drive force of the engine to the wheels; and
   a work device that is provided on a front portion of a vehicle body and rotatable in a vertical direction, wherein
   the loading work vehicle further comprises:
      a traveling state detection sensor configured to detect a traveling state of the loading work vehicle,
      an operation detection sensor configured to detect an operation of the work device;
      a mode switch device configured to switch between a limit mode for limiting maximum traction force of the loading work vehicle and a normal mode for not limiting the maximum traction force of the loading work vehicle; and
      a controller configured to control the traveling hydraulic pump and the traveling hydraulic motor, and the controller is further configured to:
         determine whether the limit mode is selected based on a mode switch signal from the mode switch device;
         in a case of determining that the limit mode is selected, specify an operation state of the loading work vehicle based on the traveling state detected by the traveling state detection sensor and the operation of the work device detected by the operation detection sensor;
         in a case of specifying that the vehicle body is traveling in a state of not performing a lifting operation of the work device, limit the maximum traction force of the loading work vehicle to a first set value which is set based on a static friction coefficient between a road surface and the wheels as well as weight of the vehicle body;
         in a case of specifying that the work device starts excavating an object to be excavated, increase the maximum traction force of the loading work vehicle from the first set value to a second set value that is greater than the first set value and also less than a rated value of the maximum traction force in the normal mode in response to the lifting operation of the work device; and
         in a case of specifying that the work device starts excavating the object to be excavated and also in a case that the work device is in a horizontal posture, maintain the maximum traction force of the loading work vehicle to the second set value.

2. The loading work vehicle according to claim 1, wherein the second set value set based on the static friction coefficient between the road surface and the wheels, the weight of the vehicle body, and digging force of the work device.

3. The loading work vehicle according to claim 1, wherein the controller is further configured to control the maximum traction force of the loading work vehicle by adjusting a maximum displacement volume of the traveling hydraulic motor.

4. The loading work vehicle according to claim 1, further comprising:
   a loading hydraulic pump that is driven by the engine and supplies hydraulic oil to the work device; and
   an operation device for operating the work device,
   wherein the operation detection sensor is at least one of a discharge pressure detection sensor configured to detect discharge pressure of the loading hydraulic pump and an operation amount detection sensor configured to detect an operation amount of the operation device.

5. The loading work vehicle according to claim 1, wherein the work device includes a lift arm with a distal end portion to which an attachment is rotatably attached, and
   the controller is further configured to determine that a lifting operation of the lift arm is started to specify that the work device starts excavating the object to be excavated.

* * * * *